United States Patent
Hase

[11] 3,944,904
[45] Mar. 16, 1976

[54] BATTERY CHARGING CIRCUIT
[76] Inventor: Alfred M. Hase, 6 Manorwood Road, Scarborough, Ontario, Canada
[22] Filed: May 7, 1975
[21] Appl. No.: 575,125

Related U.S. Application Data
[63] Continuation-in-part of Ser. No. 400,429, Sept. 24, 1973, abandoned.

[52] U.S. Cl. ........................ 320/23; 320/21; 320/39
[51] Int. Cl.$^2$ ............................................ H02J 7/04
[58] Field of Search ............................. 320/21–24, 320/19, 39, 40

[56] References Cited
UNITED STATES PATENTS

| | | | |
|---|---|---|---|
| 3,252,070 | 5/1966 | Medlar et al. | 320/21 |
| 3,487,284 | 12/1969 | Cady | 320/40 X |
| 3,510,746 | 5/1970 | Furuishi et al. | 320/39 |
| 3,527,994 | 9/1970 | Bourgeault | 320/39 |

*Primary Examiner*—J. D. Miller
*Assistant Examiner*—Robert J. Hickey
*Attorney, Agent, or Firm*—Donald E. Hewson

[57] ABSTRACT

A battery charging circuit is provided where a synchronous switch, such as a magnetic amplifier, saturable reactor, silicon controlled rectifier, triac or contactor, each of which is controllable, is inserted in a charging circuit and is controlled by a circuit such that when the terminal voltage of a battery which is being charged by a substantially constant, ripple-free DC current reaches a predetermined level, an intermittent DC charge is initiated. The periods of operation are of a predetermined, fixed length and at a predetermined current level. Means may be provided to reduce the finish charge to an intermittent trickle charge when the terminal voltage of the battery reaches its rated level. Counting means can be provided for determining the number of periods of operation of intermittent charging current delivered to the battery, for surveillance of battery condition and so as to determine ampere-hour back charge. The control circuit is arranged so as to be fail safe, by insertion of a current level bias control element in series in the control circuit for the synchronous switch, with the knowledge that such bias control elements fail "open". Thus, no override protection devices are required. The method of charging the battery includes supplying a constant, substantially ripple-free DC charging current until the battery terminal voltage reaches a predetermined level, and then initiating an intermittent DC charging current while continuously sensing the battery terminal voltage.

7 Claims, 6 Drawing Figures

BATTERY CHARGING CIRCUIT

CROSS-REFERENCE TO OTHER APPLICATIONS

This application is a continuation-in-part of application Ser. No. 400,429, filed Sept. 24, 1973, now abandoned.

FIELD OF THE INVENTION

This invention relates to a battery charging circuit, and more particularly a charging circuit for storage batteries. The invention provides an apparatus and a method of charging storage batteries — especially industrial and truck-type storage batteries — where the charging current is substantially ripple-free DC and the finish charge applied to the battery is intermittent, with a predetermined period or on-time, and where the off-time of the intermittent finish charging current is dependent on the state of the terminal voltage of the battery.

Background of the Invention

There have been numerous battery charging circuits and systems, especially for industrial and truck-type storage batteries, including high/low constant current charging systems, high/low taper current charging systems, continuous taper charging, and modified constant potential charging. More particularly, there has been developed by the present applicant a charging system which is disclosed in U.S. Pat. No. 3,848,173 issued Nov. 12, 1974 which follows a sequence of constant current, then constant voltage, finally constant current and optionally trickle charge, for industrial and truck-type storage batteries.

All of the types of charging systems that have been mentioned, however, require that there be some form of transfer from a high charging rate to a low charging rate either by voltage or current sensing, and requiring protection for the charging circuit as well as for the storage battery by overriding controls which are driven by timer means. In general, therefore, all such previously known charging systems must, in order to provide optimum charging performance, be set to operate under the assumption of ideal storage battery performance. In other words, the operation of the charging system may be predicated on a known charge-back requirement to the storage battery, so that the amp-hour charge-back can be predetermined over a given period of time, after which the charging performance of the system is such as to be at a low level to preclude over-charging and subsequent damage to the battery. The charging system in applicant's patent noted above overcomes that difficulty, but requires a timed override circuit in any event. In the case of most of the earlier battery charging systems, a malfunction or cell damage — such as partial short circuit between cell plates — may result in damage to the battery because the critical voltage to be sensed and which would transfer the high level operation to a low level operation may be at a higher voltage level than can be achieved with the malfunction or cell damage. Override protection to automatically transfer the charging operation after a given period of time is therefore required, simply to preclude excessive damage to a malfunctioning or less than perfect storage battery.

The prior art includes Du Puy et al U.S. Pat. No. 3,617,851 issued Nov. 2, 1971, which teaches that there is always a pulsed charge supplied to the battery. Du Puy et al are mostly concerned with providing a load circuit for the battery and thereby assuring forced discharge of the battery. Du Puy et al cannot improve or shorten the charging time for a battery, and run many risks with respect to internal heating of the battery, etc., as discussed hereafter.

The prior art also includes Cady, U.S. Pat. 3,487,289 issued Dec. 30, 1969. It should be noted that at all times Cady's charging current is pulsed (see column 3 at lines 20 to 26). As discussed hereafter, a pulsed charging current, particularly having short pulse periods, would have difficulty if not failure if it were used to attempt to charge a damaged battery — i.e., one that has, for example, short circuits between plates or other such damage. Also, adverse conditions, particularly high temperature, would mitigate against the successful operation of the Cady apparatus. This is because the Cady apparatus includes voltage sensing means which controls the apparatus to supply pulses of charging current to the battery until the voltage reaches a predetermined value. The pulses are supplied at a continuous rate over a given period; but they are pulses and not substantially ripple-free DC charging current. Cady remarks that at any given average charging rate, the battery terminal voltage will not change significantly; but he overlooks the consequences and effect of internal $I^2R$ losses. When a predetermined terminal voltage is reached, which may represent as much as 90% of the full charge for a lead acid storage battery — thereby underscoring the criticality of voltage sensing in the Cady apparatus — the continuous pulsed supply of battery charging current is cut off and pulse parcels are thereafter supplied.

The present invention, on the other hand, provides a battery charging circuit and system, including a method of charging a battery, which may be predicated on an assumed — indeed, ideal — battery condition but which is, in fact operative because of the real battery condition of the battery being charged. This is accomplished by charging a battery to a predetermined percentage of its rated amp-hour capacity, and thereafter initiating an intermittent charging operation. A substantially ripple-free DC charging current is supplied to the battery from a circuit including controllable synchronous switch means having a control circuit therefor. When the battery condition is such that its performance is ideal, the intermittent finish charge will provide the requisite ampere-hour back charge to the battery within a given range and period of time. If the condition of the battery is less than ideal, it may take longer for the terminal voltage of the battery to reach a predetermined level at which a trickle charge may be initiated; but still the intermittent finish charge is safer for the battery condition and will allow maximum charge performance with respect to voltage of that system, irrespective of battery malfunction, cell condition or temperature. Further, the intermittent finish charging current may be controlled so that any operation period thereof is not initiated until the terminal voltage of the battery reaches a predetermined level which can be set so as to take into account the inherent voltage decay of a battery having known name plate ratings.

Thus, the present invention provides a battery charging circuit which includes a number of known integers, including a circuit for supplying an initial, substantially ripple-free constant DC charging current to the battery, and battery terminal voltage sensing means. However, this invention provides that the voltage sensing means is connected to means for initiating an intermittent charging current to the battery when the battery terminal voltage reaches a predetermined level; and the present invention specifically provides that such means includes a synchronous switch — which has a control coil — in the alternating current side of the circuit for supplying DC charging current to the battery, and gate means connected with the voltage sensing means and the control coil to initiate and stop the supply of charging current by controlling the operation of the synchronous switch. The synchronous switch is contemplated as being one having a control coil and which may be chosen from the group consisting of magnetic amplifiers, saturable reactors, silicon controlled rectifiers (especially back-to-back S.C.R's with associated filter circuitry, or triacs) and contactors.

The present invention further provides that the control coil of the synchronous switch may be connected to a timing circuit so that each operating period of the intermittent finish charging current may be predetermined. The invention also provides the battery terminal voltage at which the supply of intermittent charging current to the battery is initiated may be predetermined and adjusted. Indeed the battery terminal voltage at which each operating period of the intermittent charging current may be initiated, may be changed after a given number of operating periods, so as to allow for inherent voltage decay of an otherwise well-operating storage battery, but also so as to provide ampere-hour charge-back to the storage battery even in the event of malfunction of the storage battery but not total failure thereof.

The present invention is arranged so as to be substantially or completely free of timed override controls or other override protection. This simplification of a battery charging circuit or system may be accomplished by a provision of a voltage sensing and control network where the critical elements thereof, particularly the charging current level bias resistor, are in series within the control circuit for the synchronous switch, and where such critical elements are each of the sort which is known to fail "open". Thus, the battery charging circuits of the present invention are essentially "fail-safe", and devoid of costly override protective circuitry and timers.

By the further provision of lapsed time indicators which are operative only when pulsed finish charge is being supplied to the battery, total amp-hour back-charge may be easily computed. Further, counting circuits may be provided to count the number of operating periods of intermittent charging current, and a means for surveillance of battery condition is thereby provided. Battery condition which has deteriorated to the extent that it will not hold a charge, or be such that a malfunction or cell failure has occurred, may be detected by review of the charging characteristic of the battery including a review of the ampere-hour back-charge to the battery and the number of times that an operating period of intermittent charging current has been initiated because of decay of the battery terminal voltage to a trigger level.

Thus, the present application teaches an invention which has non-critical sensing; that is, the intermittent direct charging current is started at a terminal voltage which any battery will reach during charging. A timed override circuitry and the need therefor are eliminated, because it is not necessary when using intermittent DC charging current to force a cut-off of supply of charging current to a battery in the event that the battery may be faulty. This is accomplished by predicting a worst case situation with respect to the state of the battery, or otherwise accurately determining the actual condition of the battery, and setting up an initial constant ripple-free DC charging current to the battery so as to provide an amp-hour charge-back to the battery in a given period of time. It is important to note that the charging current is substantially ripple-free DC, and not a series of short period pulses such as from a rectified but non-filtered AC input.

The terminal voltage at which the intermittent DC charging current to the battery is initiated is sufficiently low that even an old battery will reach that level unless the battery is irreparably damaged. That level may be about 2.2 to 2.4 volts per cell for a lead acid battery, and about 1.45 to 1.55 volts per cell for a nickel cadmium battery.

It is important to note with respect to storage batteries that a pulsed charging current to a battery causes internal heating within the battery and loses time. This is because a given amp-hour back-charge must be delivered to the battery in a given period of time, and if the back-charge supply to the battery is pulsed, then during the time when energy is being delivered to the battery, it must be delivered at a higher level. Also, as noted in this application, there may be some discharge of the battery when it is not being charged, so that the amp-hour back-charge to be delivered over a given period of time by a pulsed or rippled charging current may be difficult to control because of lost energy during that period of time. More importantly, as noted hereafter, the equivalent circuit for a battery is such that when there are higher charging currents as required with a pulsed charging circuit, there are greater $I^2R$ losses in the internal series resistor thereof. Thus, the losses increase with the square of the amplitude of the charging current; resulting in wasted energy and uneconomic operation.

Another point to be considered with respect to storage batteries is that with age, there is antimony poisoning of the battery, flaking of the battery plates, higher internal resistance within the battery, etc. As time goes by, the terminal voltage which may be sensed at a battery while it is being charged becomes less and less meaningful, because of the above conditions. Thus, after as little as 3 to 5 years in some cases, a battery may behave at its terminals as if it has lost its storage capacity because the terminal voltage or voltage per cell cannot reach the same level as it did when the battery was new. However, it may be that there are another ten years of useful life in that battery, provided that due consideration is given to the fact that its ultimate terminal voltage or voltage per cell has reduced.

Still another factor to be considered with respect to batteries is that when a battery discharges — either during a pulsed charging sequence between the pulses thereof, or in operation — the battery heats up because of $I^2R$ losses in the internal series resistance. Batteries have a negative temperature factor, that is, the higher the ambient temperature in which they are operating or the higher the internal temperature of the battery, the lower the ultimate terminal voltage which is attainable becomes. Also, as noted, antimony poisoning lowers the ultimate terminal voltage. Thus, temperature which may result from internal heating of the battery has such an adverse effect on a battery during charging that there may be some conditions arise where a battery charger which is connected to it and which is set to turn off when the terminal voltage or voltage per cell of the battery reaches a predetermined level which is substantially the rated level for the battery, might never turn off because the battery might not be able to reach that voltage level. The present invention, as noted hereafter, provides a fail-safe battery charger and method, because of non-critical terminal voltage sensing.

Brief Summary of the Invention

It is a purpose of this invention to provide a battery charging system having maximum charge performance with respect to voltage, irrespective of the battery condition, where the finish charging current supplied to the battery is intermittent DC and each operating period thereof is of a predetermined length and at a predetermined current level.

A further object of this invention is to provide a battery charging system including the method of charging a battery by providing an intermittent DC finish charge at given levels, where the initiation of the intermittent charging current is initiated when the battery terminal voltage reaches a non-critical predetermined level.

Yet another feature of this invention is to provide a battery charging circuit which can be accommodated for surveillance of battery condition and characteristics.

Still another feature of this invention is that a battery charging circuit is provided without the need for expensive and complicated override and timing circuits, and yet which is operative without danger or any likelihood of overcharging a storage battery.

DESCRIPTION OF THE DRAWINGS

These and other features and objects of the invention are more clearly discussed hereafter in association with the accompanying drawings, in which.

DESCRIPTION OF THE PREFERRED EMBODIMENTS

Figure 3:
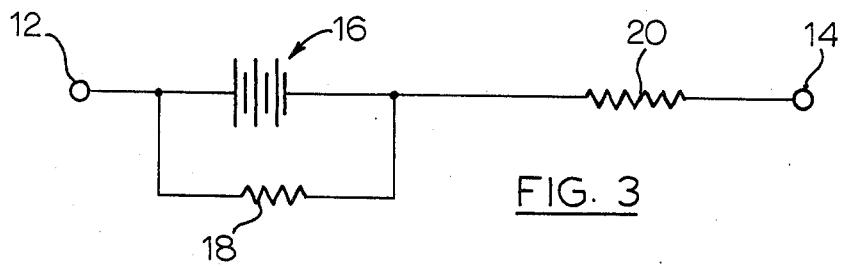
FIG. 3 is an equivalent circuit of a battery.

The ampere-hour back-charge characteristic of a storage battery — particularly lead-acid storage batteries of industrial or truck-type ratings — is a function of the battery condition. This may include reference to the paste condition of the battery plates of each cell, any partial or incipient short circuits within a cell or between cells of the storage battery; battery malfunction, and so on. There is shown in FIG. 3 an equivalent circuit for a battery, where terminals 12 and 14 are the battery terminals, and between them there is situated a counter EMF voltage source 16 having a shunt resistor 18 across it, the shunted CEMF and resistor being in series with an internal resistance 20. Usually, as the life of a storage battery increases, the value of the shunt resistance 18 decreases. Thus, as a storage battery becomes older, there is greater internal leakage of stored energy from the battery, which is dissipated by the decreasing shunt resistor 18. In addition, battery plate paste may tend to become released from the plate grids, and the ampere-hour storage capacity of the storage battery is decreased. It is these factors which particularly contribute to alteration of the back-charge characteristic of the storage battery with age.

The back-charge characteristic of a storage battery can be graphically represented by plotting battery terminal voltage against time as the battery is being charged. Generally, when the battery is charged with a constant charging current, the curve is exponential having a high initial rise and becoming asymptotic to the horizontal after a period of time. When the storage battery reaches its capacity — which may be its rated capacity or something less than its rated capacity depending upon the age of the storage battery — the terminal voltage levels off. It is at this time, however, that great danger exists that the storage battery may be overcharged and destroyed. Thus, it is usual to reduce the level of the charging current when the battery approaches its capacity, or to completely stop the charging operation.

However, when the charging operation of a storage battery is completely stopped, and the battery is left simply to sit until it is required for its usual purposes, some of the stored energy of the battery may be dissipated because of the internal shunt resistance of the battery. Thus, when the charging operation has ceased, there is a decay of the battery terminal voltage in time. With a new battery, the decay may have a very shallow slope; but with an older storage battery, the voltage decay may have a fairly high initial downwards slope — it being understood that the battery terminal voltage decay characteristic is also an exponential curve whose exponent is a function of battery condition and age.

If an initial, substantially ripple-free DC constant charging current to a storage battery is interrupted at a time when the battery is charged to a non-critical portion of its capacity — either with respect to its nameplate rating or its known capacity or a formula capacity having regard to the age of the battery and other consideration — and the final charge to the battery is supplied to it by an intermittent DC charging current, the storage battery can be charged under specific control which is predicated either on its real or an assumed battery condition. That is to say, battery terminal voltage sensing apparatus and control circuits can be associated with gate circuits which are, in turn, associated with a control coil of a synchronous switch of the sort discussed hereafter, so as to provide the intermittent DC charging current to the battery, where the operating periods thereof may be essentially at a constant current level and for a given period of time. However, the initiation of the pulses may be determined by the state of the battery terminal voltage; in other words, the intermittent charging current supplied to a nearly fully charged storage battery becomes a function of the ability of the battery to take a charge and to retain stored energy. Thus, the finish charging operation to a storage battery, under conditions as set out by the present invention, provides maximum charged performance with respect to battery terminal voltage without danger of overcharging the battery and without override controls; but with regard either to the real battery condition or an assumed battery condition.

The synchronous switch referred to above is one which has a control coil or gate which would be connected into control circuitry, and which operates as an on/off switch in the circuit for supplying charging current to a storage battery. The synchronous switch may be a magnetic amplifier or saturated reactor, a pair of SCR's with suitable filter circuitry, or a triac; or in a DC circuit a contactor may be used. In any event, the synchronous switch is one which operates only under control of its control coil or gate, and which is otherwise in an "off" condition.

Figure 4:
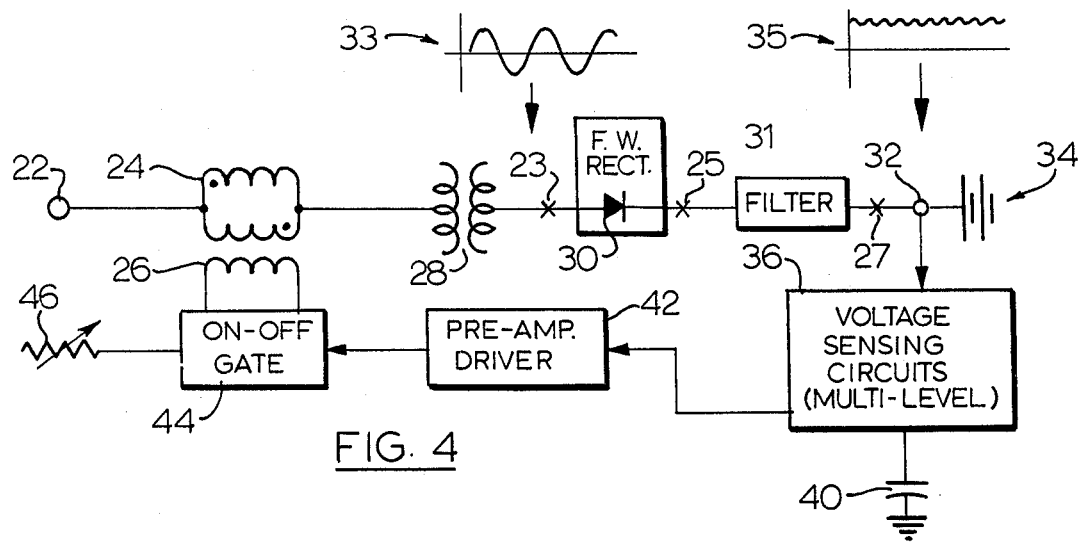
FIG. 4 is an embodiment of a basic battery charging circuit in accordance with this invention.

Referring now to FIG. 4, there is shown a basic circuit in accordance with this invention; and the circuit is shown in a simple, single line convention with the understanding that the circuit is made with respect to a return line or ground. An input terminal 22 accommodates an alternating current input of suitable voltage. A synchronous switch 24 is in series with the input, and has a control coil 26 which is connected in a control circuit as discussed hereafter. A suitable step-up or step-down transformer 28, rectifier circuit 30 and filter 31 are in series with the synchronous switch 24, and with an output terminal 32 at which a substantially ripple-free DC current at suitable voltage levels is delivered to battery 34. Other positions 23, 25 and 27 are shown in the line between the input terminal 22 and the output terminal 32, and they are positions at which the synchronous switch might alternately be situated — keeping in mind that positions 25 and 27 would be suitable only for an SCR or DC contactor and not for AC operating synchronous switch such as a saturable reactor or magnetic amplifier. Battery terminal voltage sensing circuitry such as those that are well known in the art are connected to the output terminal 32 and are shown at 36. The voltage sensors 36 may be multi-level, as discussed in greater detail hereafter. A capacitor 40 may be connected to ground, for purposes to be discussed hereafter. The voltage sensors 36 are, in turn, connected to a preamplifier and driver 42 which in turn is connected to an on-off gate 44. The gate 44 is connected to control coil 26 of the synchronous switch 24; or the suitable control input of the synchronous switch if it is at positions 23, 25 or 27. A current level bias resistor 46 is also connected to the on-off gate 44 so as to control the current level of the charging current delivered at output terminal 32, by controlling the level or degree of saturation of the synchronous switch 24 as a result of the voltage condition of its control coil 26. In its usual configuration, there is AC in the circuit before the rectifier 30 as shown by indicator curve 33; and substantially ripple-free DC following the filter 31, as shown by indicator curve 35.

The circuit of FIG. 4 is, as noted, a basic circuit in accordance with this invention, and as noted hereafter it is one which would normally be set so that its operation is predicated on an assumption that battery 34 is in good condition. The operation of the circuit of FIG. 4 may, however, be adjusted to accommodate a declining back-charge characteristic of the battery 34 as it ages.

Figure 1:
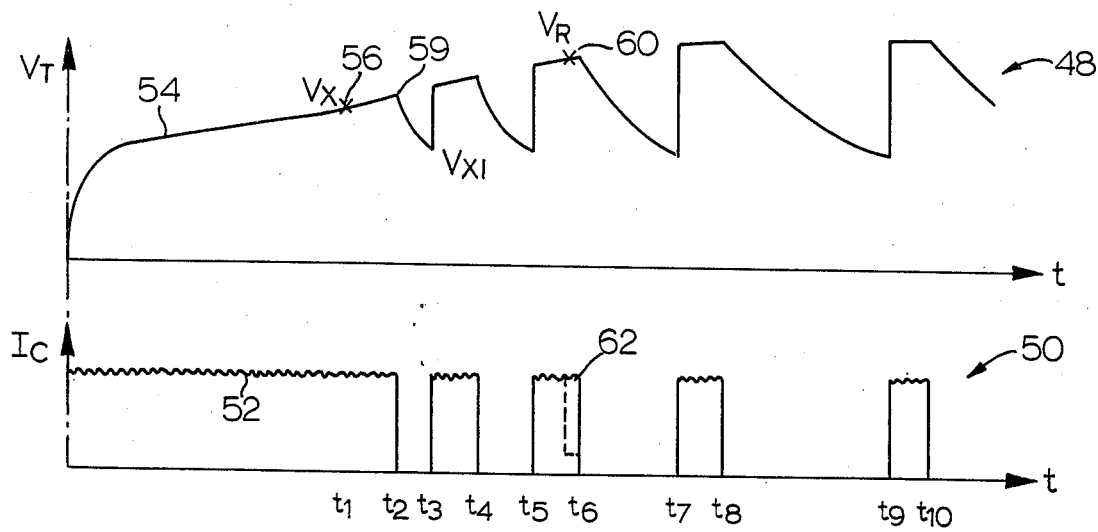
FIG. 1 is a curve showing voltage and current conditions during operation of a battery charger according to this invention in one mode of its operation.

Turning now to FIG. 1, a typical operation of a battery charging circuit in accordance with this invention, such as that of FIG. 4, can be explained. FIG. 1 includes two curves 48 and 50 which are plots of battery terminal voltage and charging current, respectively, against real time. The scales of each of the curves are now shown and are not necessary, but typically the voltage scale may be in the order of up to 100 volts (although usually up to 12, 24 or 36 volts); the current scale may be up to several hundred amperes although usually much less; and the time scale may be from 8 to 24 hours.

During an initial battery charging operation, an initial substantially ripple-free, constant DC charging current is supplied to the battery as shown at 52, and the battery terminal voltage rises — assuming a total discharge at the initiation of the charging operation — as shown at 54 until it reaches a specific voltage $V_x$ indicated at 56. At that time, the intermittent finish charging mode is initiated, in accordance with this invention. The level of the finish charge would normally remain constant at the level of the initial charging current. In any event, the voltage sensing circuitry 36 senses the voltage $V_x$ and initiates the first operating period of the intermittent DC charging current at time $t_1$. The DC current is delivered for a predetermined period of time until time $t_2$; and that period of time may be determined by the discharge characteristic of capacitor 40. At time $t_2$, the gate 44 is turned off, which in turn collapses the voltage of control coil 26 and turns the synchronous switch 24 off. No further DC charging current is delivered to battery 34 at terminal 32, and the charging current reduces to zero at time $t_2$. The terminal voltage of the battery 34 would, however, have risen to a new level shown at 59; and when the battery charging operation ceases, the terminal voltage of the battery 34 begins immediately to decay. As noted above, the amount of decay may be conditional upon many things, including especially the physical condition of the storage battery and its age. Nonetheless, the terminal voltage may decay to a specific trigger level which is sensed by voltage sensing circuitry 36, and when it reaches that level — which may be substantially the voltage $V_x$ or another predetermined voltage level $V_{xl}$ — voltage sensing circuitry 36 operates to close gate 44 and thereby to turn the synchronous switch 24 on. This occurs at time $t_3$, and at that time the DC charging current level may again rise to the level as indicated in curve 50. The terminal voltage of the battery 34 will almost immediately recover to approximately the level as shown at 59, and as the supply of charging current continues the terminal voltage of the battery may continue to rise. This continues until time $t_4$ at which time the operating period of the DC charging current is again stopped; and once again the terminal voltage of the battery 34 begins to decay while the charging current remains at zero. This may continue until the terminal voltage decays to the predetermined level $V_{xl}$ at time $t_5$ when a further operating period of DC charging current is initiated. The time from $t_2$ to $t_3$ may be shorter than the time from $t_4$ to $t_5$ because the battery terminal voltage is higher at $t_4$ than at $t_2$, therefore a greater amount of time for terminal voltage decay to a given level is required.

At time $t_5$, a further operating period of intermittent DC charging current may be initiated and once again the battery terminal voltage would almost immediately recover to its previous level and continue to rise. It is assumed in curve 48 that during this operating period, the terminal voltage reaches its rated voltage $V_r$, shown at 60, but that the DC charging current continues. However, the charging current may continue at its previous level as shown at 62, or it may reduce to a trickle rate as shown at 63. The operating period is, in any event, terminated at time $t_6$. Thereafter, further operating periods of charging current, either at the previous level or at the trickle charge level may be initiated at times $t_7$ and $t_9$; and it will be noted that the length of each period is essentially constant. It will also be noted from curve 48 that the voltage level $V_{xl}$ at which each of the operating periods of the intermittent DC operation is initiated, beginning at time $t_3$, is the same.

The curves of FIG. 1 are exemplary of the charge-back characteristic of a battery which is essentially in excellent working condition and which is not unduly old. This is especially evident from the decay characteristic of the battery, where some considerable length of time may pass before the battery terminal voltage decays to a given or predetermined level which may be very close to the rated terminal voltage. The rate of the intermittent DC finish charge current is determined, in the operation of a battery charging system according to this invention as illustrated in FIG. 1, by the real battery condition as determined by the voltage sensing circuitry 36.

Figure 2:
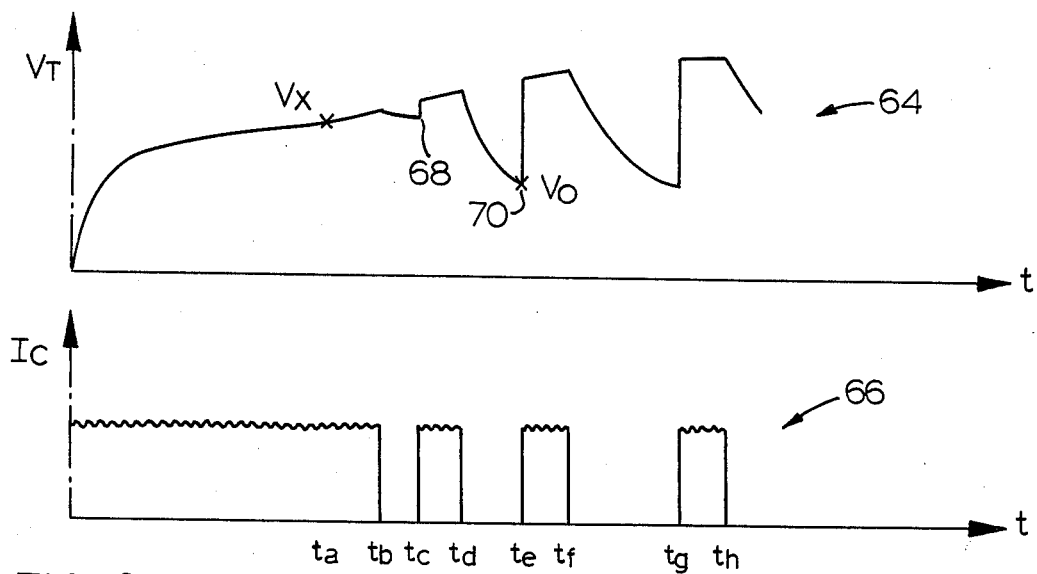
FIG. 2 is a curve similar to FIG. 1 showing voltage and current conditions in a different mode of operation of a battery charger according to this invention.

Turning to FIG. 2, another set of curves 64 and 66 is shown, which are essentially the same as curves 48 and 50 except that it will be noted the operating period of intermittent DC charging current which is initiated at time $t_c$ is initiated at a voltage level indicated at 68; whereas the operating period which is initiated at time $t_e$ is initiated at a lower battery terminal voltage 70, designated $V_o$. In this case, the multi-level voltage sensing circuitry 36 has reset after the first operating period to a second, lower voltage $V_o$, allowing more battery terminal voltage decay than in the conditions which are exemplified in FIG. 1. The curve 64 of FIG. 2 may be exemplary of a storage battery which is somewhat older than the storage battery whose back-charge performance is characterized and exemplified in curve 48 of FIG. 1; and it will be noted that the battery terminal voltage decay of the battery characaterized by curve 64 is much faster than that of the battery characterized by curve 48.

The trigger levels $V_x$ and $V_o$ may be set so that the operation and the charge-back characteristic of the battery charging system essentially duplicates that of the battery; or they may be set with an assumption of battery condition, where the assumption is that the battery condition may be better than might be expected. That is to say, if the battery condition is worse than is assumed, so that the frequency of back-charge intermittent DC charging current initiations is much higher than would be expected, such conditions would prevail when the decay characteristic of the essentially charged battery is such that the battery loses its charge very quickly and the battery terminal voltage reduces very quickly. Nonetheless, overcharging of the battery is precluded, because the length of time of any operating period of intermittent supply of DC charging current to the battery is predetermined by the capacitor 40 of FIG. 4 or other timing circuitry as discussed hereafter. It may therefore be that a greater ampere-hour back-charge has been supplied to the battery than its capacity would anticipate; and if the operation of the charging circuit and the number of times that a period of supply of DC charging current is initiated, is under surveillance by supervisory or monitoring circuitry, a faulty or malfunctioning battery can be detected.

Figure 5:
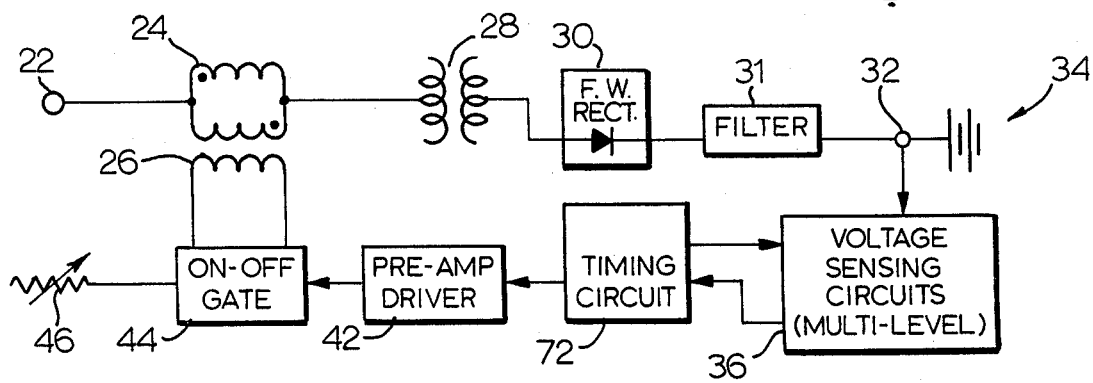
FIG. 5 is a further embodiment of a battery charging circuit according to this invention.

The circuit of FIG. 5 essentially duplicates that of FIG. 4, except that a timing circuit 72 is connected between the voltage sensing circuitry 36 and the preamplifier driver 42. The timing circuits may also have other, associated circuitry to control the level of the DC charging current.

Figure 6:
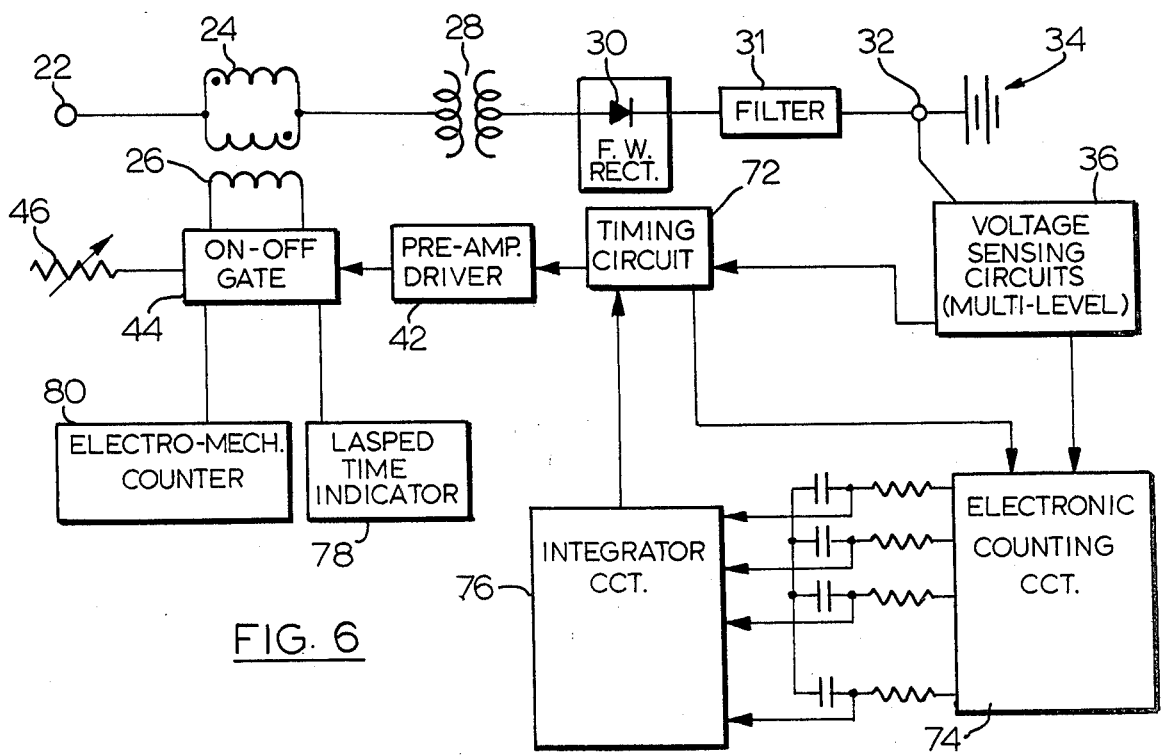
FIG. 6 is a still further embodiment of a battery charging circuit according to this invention.

The circuit of FIG. 6 is for a battery charging system where assumptions are made as to the charge-back characteristic of the battery 34; and counting circuitry and integrating circuitry are provided so that, for example, each successive off period between operating periods of intermittent DC charging current can be controlled to be longer than the preceding one by integrating circuits 76.

The circuit of FIG. 6 also shows a lapsed time indicator 78 which may be calibrated or read as a meter which shows the total ampere-hour back-charge which has been supplied to the battery after the initiation of the intermittent DC charging operation. An electromechanical counter 80 is also shown, and each of the counter 80 and the lapsed time indicator 78 is connected to the gate 44. Thus, if the gate 44 in the circuit of FIG. 6 — or indeed, the circuit of FIG. 4 or 5 when the lapsed time indicator and the counter are connected to the gate 44 of those circuits — operates more frequently than would be expected from a battery having known charge-back characteristics, the battery can be suspected of being faulty or to have a malfunction, and can be examined. This would be especially the case where the lapsed time indicator would show a greater ampere-hour back-charge to the battery than its total capacity; or where an unusually high number of DC charging current operating periods may have been initiated by the voltage sensing circuitry.

It has been noted that the circuits of the present invention provide maximum charge performance with respect to battery terminal voltage, irrespective of battery malfunction or condition; and of course, such apparatus would operate irrespective of the operating temperature. There is no critical voltage sensing means, in that the operation of the circuits of FIGS. 4, 5 or 6 is not dependent on the presence or absence of a critical voltage to reduce an otherwise continuous charging current to a safe level.

Indeed, the circuits of the present invention are such that the final terminal voltage of the charged battery may decrease with age, antimony poisoning, etc. and yet the apparatus will still operate. The operation of the prior art devices is wholly predicated on the state or condition of an ideal battery at ideal ambient temperatures; whereas the circuits of the present invention are time-dependent, and not voltage dependent. Thus, each operating period of intermittent DC charging current is turned off after a fixed period of time, thereby precluding the chances of thermal runaway or other severe battery damage. The present invention does not sense voltage rise, but lets the battery terminal voltage do what it will over a predetermined length of time, the length of time of the pulse being chosen so that the amp-hour charge back to the battery during that period of time will be safe. The terminal voltage of the battery is then permitted to drop back after the charging current has been stopped, until it reaches a predetermined level whereupon more DC charging current is supplied for a given period of time.

If the control circuitry of any of the circuits in FIGS. 4, 5 or 6 fails, such failure would be to the effect that the gate 44 would open and the synchronous switch 24 would turn off so as to preclude the danger of overcharging the battery 34. If no battery terminal voltage is sensed, the gate 44 is turned off, and the charging operation is terminated. It should also be noted that the one component which may, by experience, be most likely to fail is the current level bias resistor 46; and it will be noted that the resistor is in series with the control coil 26, so that failure of the bias resistor 56 — which failure is invariably such that the resistor opens — would result in collapse of control coil 26 voltage, so that the synchronous switch 24 would open.

Because the finish charge may be at a trickle level, the battery 34 may be maintained in substantially fully charged condition while connected to the charging circuit, over long periods of time. Even when the intermittent DC charging current level is not reduced to a trickle level, overcharging of the battery 34 can still be precluded by permitting the battery terminal voltage to decay to a lower level before the next operating period is initiated, with the assumption or knowledge that an operating period of a given length of time at a given level would deliver a given ampere-hour back-charge to the battery. If the starting condition of the battery is known by its relation to the battery terminal voltage which initiated the intermittent DC charging current operation, overcharging of the battery may be precluded.

If a circuit in accordance with this invention has two or more predetermined battery terminal voltage levels, at which the control circuit operates, the second level is normally lower than the first level, which allows for a greater battery terminal voltage decay before the initiation of another DC charging current operating period. The operation of the circuit to ignore the first level and to work at the trigger level may be by suitable lock-out circuitry which could be operable after a given period of time, or after the first or any specific number of intermittent operating periods of DC charging current have been supplied to the battery. The circuit of a battery charger system in accordance with this invention would normally have the options of control as discussed above, so as to accommodate new or older batteries in a variety of name-plate ratings.

It is obvious that the other changes and amendments to the basic circuitry in accordance with this invention may be made, depending on the availability or desirability of the use of specific components which are well known in the battery charger field. However, the present invention provides a method for charging storage batteries where the finish charge is delivered in an intermittent DC charging current manner, at a given current level and for specific operating periods, but where the initiation of each operating period is dependent on the battery condition as it is particularly determined from battery terminal voltage. As noted, timing circuits can be inserted together with integrating circuits so that an assumption can be made as to the state of charge or the condition of the battery, and if the state of charge or condition of the battery is worse than the assumption, abnormal operation of the charging circuit can be noted and the battery examined for malfunction. Also, the timing or other control circuitry can be provided so as to assure that a given ampere-hour back-charge is supplied to the battery and the back-charge characteristic of the battery observed thereafter to determine if indeed the battery has been fully charged or charged to a known level with respect to its name-plate rating.

The operation of a device according to this invention may also be set so as to provide a tapered back-charge to a battery, where the on-time of each operating period could be made to be determined by the terminal voltage of the battery. Thus, battery terminal voltage sensing means of the sort referred to above can be associated with the driver and control coil of the synchronous switch to turn off the pulse at a predetermined battery terminal voltage level; and such control could be associated with an override circuit, particularly in circumstances where it is desired to preclude high battery terminal voltage.

The description and illustration of battery charging circuits and the method of battery charging in accordance with this invention are exemplary because of the number of variables that can be accommodated by circuitry according to this invention, and are not intended to be limited. Rather, the scope of the present invention is determined from the appended claims.

I claim:

1. A battery charging circuit for charging storage batteries, including;
    DC circuit means for supplying an initial constant DC charging current to a battery from an alternating current source;
    first and second adjustable battery terminal voltage sensing means;
    control circuit means connected with said first battery terminal voltage sensing means and said DC circuit means for initiating an intermittent DC charging current supply to said battery, the first operating period of which is initiated at the instant when said battery terminal voltage reaches a first predetermined level;
    synchronous switch means connected in the alternating current source side of said DC circuit means;
    gate means connected to said first and second battery terminal voltage sensing means and to said synchronous switch means, said gate means being adapted to control said synchronous switch means so as to initiate and stop the supply of alternating current to the DC circuit means and thereby to control each operating period of time of said intermittent DC charging current supply; and
    a timing circuit which is connected to said gate means so as to control the length of each operating period of time including the first operating period of time, of said DC circuit means after said intermittent DC charging current supply has been initiated;
    said second battery terminal voltage sensing means being connected to said gate means and adapted to operate after the first operating period of time of said DC circuit means; said second voltage sensing means being set to initiate an operating period of said intermittent DC charging current supply each time the battery terminal voltage reaches a second predetermined battery terminal voltage level which is below said first predetermined voltage level.

2. The battery charging circuit of claim 1 where said first predetermined battery terminal voltage level is set so as to be below the battery terminal voltage above which the continued supply of said DC charging current over a long period of time may result in overcharging of the battery, and at a non-critical level which the battery terminal voltage will always reach.

3. The battery charging circuit of claim 1 where current level control means are provided in said control circuit that if said level control means fails, said gate means turns off to stop the supply of alternating current to said DC circuit means and thereby to stop supply of DC charging current to said battery.

4. The battery charging circuit of claim 1, further including means to reduce the amplitude of said intermittent DC charging current when the terminal voltage of said battery reaches a third predetermined level higher than said first predetermined level.

5. The battery charging circuit of claim 1, further including means for altering said second predetermined level of said second battery terminal voltage sensing means after a predetermined number of periods of operation of said intermittent DC charging current.

6. The method of charging a storage battery including the steps of:

supplying an initial constant DC charging current to the battery until the terminal voltage thereof reaches a first predetermined level; then immediately initiating the first operating period of an intermittent supply of DC charging current to the battery, where each operating period of said intermittent supply of DC charging current supplied to said battery is predetermined; and at the same time as said intermittent supply of DC charging current is initiated, simultaneously beginning operation of voltage sensing gate means which senses the terminal voltage of said battery and starts each subsequent operating period of said intermittent DC charging current whenever the terminal voltage of said battery reaches a second predetermined level which is below said first predetermined level.

7. The method of claim 6, further including the step of initiating a trickle charge of DC charging current when the terminal voltage of said battery reaches a third predetermined level higher than said first predetermined level.

* * * * *